(12) United States Patent
Lindemann et al.

(10) Patent No.: US 10,926,959 B2
(45) Date of Patent: Feb. 23, 2021

(54) CONVEYING ROLLER WITH FRICTIONALLY FITTING AND/OR INTEGRAL COUPLING BUSHING

(71) Applicant: INTERROLL HOLDING AG, Sant' Antonino (CH)

(72) Inventors: Harry Lindemann, Wermelskirchen (DE); Dominik Langensiepen, Wermelskirchen (DE); Reinhold Weichbrodt, Wermelskirchen (DE)

(73) Assignee: INTERROLL HOLDING AG, Sant' Antonino (CH)

( * ) Notice: Subject to any disclaimer, the term of this patent is extended or adjusted under 35 U.S.C. 154(b) by 0 days.

(21) Appl. No.: 16/469,195

(22) PCT Filed: Dec. 15, 2017

(86) PCT No.: PCT/EP2017/083025
§ 371 (c)(1),
(2) Date: Jun. 13, 2019

(87) PCT Pub. No.: WO2018/109165
PCT Pub. Date: Jun. 21, 2018

(65) Prior Publication Data
US 2020/0102151 A1    Apr. 2, 2020

(30) Foreign Application Priority Data

Dec. 16, 2016 (DE) .................. 10 2016 124 689.1

(51) Int. Cl.
*B65G 39/09* (2006.01)
*B65G 13/06* (2006.01)
(Continued)

(52) U.S. Cl.
CPC ............ *B65G 39/09* (2013.01); *B65G 13/06* (2013.01); *B65G 23/08* (2013.01); *F16B 5/08* (2013.01);
(Continued)

(58) Field of Classification Search
CPC ......... B65G 39/09; B65G 13/06; B65G 23/08
See application file for complete search history.

(56) References Cited

U.S. PATENT DOCUMENTS 5,442,248 A * 8/1995 Agnoff ................. B65G 23/08
                                                        310/67 R
8,789,686 B2    7/2014 Lindemann
(Continued)

FOREIGN PATENT DOCUMENTS

CN      102026894        4/2011
CN      102026894 A  *  4/2011    ............ B65G 23/08
(Continued)

*Primary Examiner* — Gene O Crawford
*Assistant Examiner* — Lester Rushin, III
(74) *Attorney, Agent, or Firm* — Price Heneveld LLP

(57) ABSTRACT

A motor-driven conveying roller for conveying installations for conveying containers, pallets and the like, having a roller body, of which the outer circumferential surface constitutes a bearing surface for articles, having a drive unit, which is arranged within an interior of the roller body, and having a coupling unit, which is designed to transmit a torque from the drive unit to an inner circumferential surface of the interior of the roller body and has a coupling bushing, which has a drive portion, connected to the drive unit, and an outer peripheral output portion, wherein the coupling bushing is connected to the inner circumferential surface of the roller body in a frictionally fitting and/or integral manner, for torque-transmitting purposes, only at certain points.

25 Claims, 8 Drawing Sheets

(51) Int. Cl.
*B65G 23/08* (2006.01)
*F16D 1/104* (2006.01)
*F16B 5/08* (2006.01)
*F16D 1/068* (2006.01)
*F16D 1/08* (2006.01)

(52) U.S. Cl.
CPC ............... *F16D 1/068* (2013.01); *F16D 1/08* (2013.01); *F16D 1/104* (2013.01)

(56) References Cited

U.S. PATENT DOCUMENTS

| | | | |
|---|---|---|---|
| 9,618,056 B2* | 4/2017 | Itoh | B65G 23/08 |
| 10,173,842 B2* | 1/2019 | Dudek | B65G 39/09 |
| 2004/0108189 A1 | 6/2004 | Itoh et al. | |
| 2007/0096541 A1* | 5/2007 | Guile | B60B 33/0039 |
| | | | 301/5.23 |
| 2011/0062000 A1 | 3/2011 | Yamamoto | |
| 2016/0312836 A1 | 10/2016 | Itoh et al. | |
| 2020/0024076 A1* | 1/2020 | Langensiepen | B65G 39/07 |

FOREIGN PATENT DOCUMENTS

| | | |
|---|---|---|
| DE | 202012005380 | 9/2013 |
| DE | 102015120922 | 10/2016 |
| EP | 1656312 | 5/2006 |
| EP | 2466730 | 6/2012 |
| JP | H0678324 | 11/1994 |
| JP | 2004190709 | 7/2004 |
| JP | 2006220172 | 8/2006 |
| JP | 2009022082 | 1/2009 |
| JP | 2010001900 | 1/2010 |
| JP | 5314678 | 10/2013 |
| JP | 2015214379 | 12/2015 |
| JP | 2016204136 | 12/2016 |
| KR | 20140111616 | 9/2014 |
| KR | 20160070689 | 6/2016 |
| WO | 2005019070 | 3/2005 |
| WO | 2009139068 | 11/2009 |
| WO | 2012084861 | 6/2012 |

* cited by examiner

CONVEYING ROLLER WITH FRICTIONALLY FITTING AND/OR INTEGRAL COUPLING BUSHING

CROSS-REFERENCE TO FOREIGN PRIORITY APPLICATION

The present application claims the benefit under 35 U.S.C. §§ 119(b), 119(e), 120, and/or 365(c) of PCT/EP2017/083025 filed Dec. 15, 2017, which claims priority to German Application No. 102016124689.1 filed Dec. 16, 2016.

FIELD OF THE INVENTION

The invention relates to a motor-driven conveying roller for conveying installations for conveying containers, pallets, and the like, having a roller body, of which the outer circumferential surface constitutes a bearing surface for articles, having a drive unit, which is arranged within an interior of the roller body, and having a coupling unit, which is designed to transmit a torque from the drive unit to an inner circumferential surface of the interior of the roller body and has a coupling bushing, which has a drive portion, connected to the drive unit, and an outer peripheral output portion.

BACKGROUND OF THE INVENTION

Motor-driven conveying rollers of this type are used for different purposes in logistics applications. They can thus be used, for example, in pallet conveying, for conveying parcels in parcel-distribution centers, for conveying containers in different types of warehouse or for transporting baggage in airports, and in numerous other applications. Such motor-driven conveying rollers here are usually used in conveying routes which comprise a plurality of rollers which are arranged one beside the other and of which the upper circumferential surface serves for receiving the articles in each case. On the one hand, these conveying routes contain idler rollers, which are not driven and are merely mounted in a rotatable manner in a conveying framework. It is also the case that said conveying routes contain driven conveying rollers, which are motor-driven and are made to rotate by an electric drive unit. These motor-driven conveying rollers are constructed such that the drive unit is arranged within the roller itself, and there is, therefore, no need for any mechanical components arranged outside the roller body in order to cause the roller to rotate. On the one hand, the motor-driven conveying rollers serve to transport the articles directly via the outer circumferential surface of the roller body thereof; on the other hand, by way of transmission of the rotation of the motor-driven conveying roller to one or more idler rollers by means of a transmission element, for example of a belt drive, the motor-driven conveying roller can also make the idler rollers rotate, so that the articles are also driven via the outer circumferential surface of the idler rollers.

EP 1 656 312 B1 discloses a motor-driven conveying roller in the case of which the drive unit is arranged within the conveying roller. This motor-driven conveying roller has a pressure-exerting unit comprising a first and a second disk, which circumferentially define a V shape, into which an elastic pressing ring is inserted. The two disks can be pushed onto a conical driveshaft of the drive unit, and forced together, by means of a central screw. In the process, a connection to the driveshaft which has force-fitting torque resistance is established between one of the two disks and, at the same time, the pressing ring can be moved from a state in which it can be introduced into the inner circumference of the roller body into a forced together clamped state, in which it is deformed in the radially outward direction, and it therefore forms a press fit both in relation to the two conical clamping surfaces of the disks forming the V shape and in relation to the inner circumferential surface of the roller body. The drive moment of the drive unit is transmitted to the roller body as a result of said force-fitting coupling.

It has been found here that the noise development can be high. Therefore, DE 20 2012 005 380 U1 has proposed an improved conveying roller in the case of which torque is transmitted from the drive unit to an inner circumferential surface of the interior of the roller body by a coupling unit, which a clamping bushing, a clamping ring, which can be moved axially in relation to the clamping bushing, a fastening element for retaining an axial position of the clamping ring in relation to the clamping bushing in a clamped position, and a pressing ring, which in the clamped position is secured between a clamping surface of the clamping bushing and a clamping surface of the clamping ring and in the clamped position has its outer circumference frictionally fitting with the inner circumferential surface of the interior of the roller body. The clamping bushing of the coupling element here has an inner cavity, and the fastening element is arranged in the radially outward direction in relation to said cavity.

Although both solutions have proven to be well suited for transmitting torques, there is nevertheless the problem that, in particular, in the case of fluctuating tolerances, the level of prestressing can be too high, and this results in a convexity forming on the outer surface of the roller body. This is highly undesirable when rollers are in operation.

There is also the problem, with lubricated motor-driven conveying rollers, that the frictional fit can be impaired by a film of oil. Although it is possible for the roller body to be cleaned from the inside during, or prior to, installation, it is nevertheless the case that permanent freedom from oil including during operation cannot be achieved in this way.

Furthermore, DE 10 2015 120 922 A1 has proposed a solution in which use is made of a power-transmission element having a connecting element, an intermediate element and an engagement element. The connecting element has an annular region. The outer peripheral surface of the annular region is provided with arcuate regions, and the inner peripheral surface of the annular region is provided with concave/convex regions. The engagement element has protrusions and a shaft-insertion hole. The arcuate regions of the connecting element are in contact with the inner peripheral surface of the roller body, and the connecting element and the roller body are likewise connected securely to one another by means of a securing device. The intermediate element engages with the concave/convex regions and the protrusions, the shaft-insertion hole of the engagement element is retained in the center of the roller body, and a drive unit engages with the shaft-insertion hole. For torque-transmitting purposes, then, individual protrusions or pins are provided, said protrusions or pins extending radially from the peripheral inner surface of the roller body and being able to engage in the apertures of the connecting element.

On account of the form-fitting engagement between the drive and roller body, it is indeed the case that the problem of the roller body deforming on account of excessive pressing action is avoided; however, the design is very complex. In addition, narrow tolerances have to be maintained during manufacturing, which is costly. Furthermore, maintenance is also problematic, specifically when the form-fitting connection is defective. In the case of a clamping connection, as is likewise known from the prior art, straightforward readjustment can be performed here, whereas the form-fitting connection requires the parts to be changed over.

The object of the present invention is, therefore, to specify a conveying roller of the type mentioned in the introduction which is of simplified design and in the case of which torque can be transmitted reliably from the drive to the conveying roller, without deformation of the roller body, even if tolerances are wide.

SUMMARY OF THE INVENTION

The object is achieved by the invention, in the case of a motor-driven conveying roller of the type mentioned in the introduction, in that the coupling bushing is connected to the inner circumferential surface of the roller body in a frictionally fitting and/or integral manner, for torque-transmitting purposes, only at certain points.

In contrast to the prior art, which provided either a circumferential frictionally fitting connection or a form-fitting connection, the present invention proposes using a frictionally fitting connection at certain points or an integral connection at certain points. Both frictionally fitting and integral connections are of significantly simplified design in relation to form-fitting connections. They allow significantly higher tolerances than form-fitting connections, as a result of which the manufacturing costs are reduced. A frictionally fitting connection at certain points is likewise simplified in relation to a circumferential frictionally fitting connection since it also allows higher tolerances. This avoids the problem of excessive pressing action on account of insufficient tolerances, and manufacturing is thus simplified overall and the conveying roller can be produced more cost-effectively.

Furthermore, a frictionally fitting connection at certain points, as proposed by the invention, has the advantage that oil which is present on the inner circumferential surface of the roller body can be more easily displaced. The invention thus makes it possible, even in the case of oil-lubricated conveying rollers, to achieve an effective frictionally fitting connection without a laborious degreasing operation having to be carried out or the frictional fit deteriorating during operation.

The invention is based on the knowledge that, in the case of motor-driven conveying rollers, there are no very high moments which have to be transmitted and, therefore, in contrast to a circumferential frictionally fitting connection, which provides a significantly greater surface area for moment-transmitting purposes, even a frictionally fitting connection at certain points is sufficient. This makes it possible to utilize the advantage of the frictionally fitting connection at certain points, in particular, the compensation for manufacturing tolerances, as a result of which manufacturing is simplified. A similar advantage is also provided by the integral connection, since the latter can also compensate for manufacturing tolerances if it is established at certain points. Therefore, the two variants are preferred in equal measure and solve the same problem.

According to a first preferred embodiment, the output portion of the coupling bushing has a plurality of radial noses, which are provided to be in contact with the inner circumferential surface of the roller body. The noses thus form points of contact, at which a frictionally fitting connection is established between the coupling bushing and roller body. The noses are preferably designed to be rounded in cross section and/or they have a slightly trapezoidal shape, which forms a slight plateau at the radially outer end. The noses preferably have an outer contour which is approximately partially cylindrical and extends in the axial direction at least to some extent, preferably to the full extent, over the coupling bushing.

It is preferably the case that the radial noses together define a diameter which is larger than the diameter of the inner circumferential surface. This achieves a particularly good frictionally fitting connection between the coupling bushing and roller body, since the noses together are oversized and the coupling bushing is thus inserted with prestressing into the roller body.

For this purpose, the noses are preferably of compliant design. The compliant design of the noses limits the radially acting force to which the roller body is subjected by the coupling bushing, as a result of which deformation of the roller body can be effectively avoided.

The noses are preferably of internally hollow design. This makes it possible for the noses to be compressed radially, in order thus to achieve a degree of compliance. The noses can be designed, for example, in the form of sheet-metal portions which act resiliently in order to subject the roller body radially to a pressing force, so that a frictionally fitting connection is thus established between the coupling bushing and roller body. In particular, as far as this aspect is concerned, it is preferred if the noses have a known spring constant which is predefined. This makes it possible, even in the case of certain tolerance deviations, to provide a radial pressing force which is within a defined range and is high enough to transmit torque from the coupling bushing to the roller body and to displace oil, but, at the same time, to avoid deformation of the roller body.

According to a further preferred embodiment, the output portion is welded to the inner circumferential surface of the roller body. According to the invention, this welding is provided only at specific points, in order to make it possible for torques to be transmitted from the coupling bushing to the roller body only at certain integrally connected points. The output portion is preferably connected to the inner circumferential surface of the roller body by means of spot welding. Roller bodies are usually provided with a layer of zinc, which is damaged in the case of a high level of heat input. In the case of spot welding, the level of heat input is very low. This makes it possible for the coupling bushing to be connected integrally to the roller body without any modification to the structural topology or the visual appearance of the zinc coating on the outer side of the roller body. This is achieved, in particular, by the minimal level of input of energy, and therefore heat, during spot welding. It is, in particular, laser spot welding which is preferred, since in this case the input of energy and heat can be kept to a particularly low level.

For example, a spot-welding connection is provided in the region of the radial noses. On account of the prestressing, the radial noses butt permanently against the inner circumferential surface, and therefore these portions are particularly suitable for the integral connection by means of spot welding. Even in the case of certain dimensional deviations, good abutment between the coupling bushing and inner circumferential surface is achieved at these portions, and this allows for spot welding.

In a further preferred embodiment, three to twenty, preferably five to fifteen, particularly preferably seven to ten, separate connecting points are provided around a circumference of the output portion, the coupling bushing being connected to the inner circumferential surface of the roller body at said connecting points. It has been found that a number ranging from three to twenty, and particularly preferably seven to ten, connecting points is sufficient in order to achieve good torque transmission and, at the same time, to absorb even forces which act axially and perpendicularly on the axis of rotation of the roller body. In relation to the above-described preferred embodiment, this means that three to twenty noses, and/or three to twenty weld spots are provided. The individual, separate connecting points are distributed preferably uniformly around the circumference. The precise number can be determined in dependence on the torques which are to be transmitted and also on the diameter of the roller body.

According to a further preferred embodiment, the coupling bushing is in two or more parts and has a radial outer part, which forms the output portion, and a radial inner part, which forms part of a shaft/hub connection and is connected to an output shaft of the drive. Since the inner part forms part of a shaft/hub connection, it can be connected particularly straightforwardly to the output shaft of the drive. For example, the output shaft of the drive has a polygonal profile, and the inner part of the coupling bushing has a polygonal socket, which corresponds with the polygonal stub of the output shaft of the drive. Further, preferred shaft/hub connections are keyway/key connections, clamping connections, and the like. A toothed connection is also conceivable and preferred. It is preferable in this embodiment for the inner part to be connected to the outer part, in order thus to ensure torque transmission from the inner part to the outer part. Provision can be made for the inner and the outer parts to be connected elastically to one another in order to compensate for drive-related jarring, other impacts, or vibrations.

In a preferred embodiment, the radially outer part is designed in the form of a corrugated sheet-metal strip and, in a particularly preferred embodiment, it is formed from a spring steel. Such a corrugated sheet-metal strip can be positioned, for example, on an essentially cylindrical circumferential surface of the inner part. It is preferably the case that the radially outer part is positioned with prestressing on the circumferential surface and, once pressed into the roller body, is compressed such that the radially outer part is connected both to the circumferential surface of the inner part and to the roller body in a frictionally fitting manner, so that torque can be transmitted from the radially inner part to the roller body via the radially outer part.

In addition to this, it is also preferred to provide, for example, a form-fitting rotation-prevention means for securing the radial outer part against rotation relative to the radial inner part. Such a rotation-prevention means can allow a certain amount of rotation as long as, after a specific rotation (in particular, of a few degrees), it engages and prevents further rotation. The rotation-prevention means should engage, in particular, when a frictionally fitting connection between the inner and outer parts is insufficient, for example, if high torques are to be transmitted.

In one embodiment, the rotation-prevention means is designed in the form of a stop, against which a circumferential end portion of the radial outer part strikes. In this case, the rotation-prevention means acts in a form-fitting manner. As an alternative, or in addition, an integrally acting rotation-prevention means is also conceivable and preferred. For example, the radial outer part can be fastened on the radial inner part by means of one or more weld spots. It is also conceivable for the radial outer part to be connected to the radial inner part in a form-fitting manner by means of a pin arrangement.

In a preferred development, the radial inner part is formed from a flexible material, in particular an elastomer material. This means that the shaft/hub connection between the inner part and the output shaft of the drive is elastic in the direction of rotation, and, therefore, jarring or other forms of loading can be absorbed. A further advantage is also constituted here by the manufacturing tolerance, since the material properties of elastic components allow the latter to compensate for manufacturing tolerances to a better extent than rigid elements.

In an advantageous configuration, the coupling bushing is mounted in an axially displaceable manner in relation to the drive unit. It is also preferable for the hub to be mounted in an axially displaceable manner. It is preferably the case that there is no additional axial fixing means provided, for example, an end-side screw for fixing the hub. Preferably, at least the hub is mounted on the output shaft of the drive by means of an axial floating bearing, or the coupling bushing is mounted on the hub by means of an axial floating bearing. This allows axial relative displacement between the coupling bushing and drive unit. On the one hand, this is preferred in order to compensate for tolerances; on the other hand, this is made possible by the connection between the coupling bushing and roller body.

According to a further embodiment, the coupling bushing has a central aperture, into which an output shaft of the drive is inserted, wherein the central aperture has protrusions and apertures extending radially in alternating fashion around the circumference. The aperture can be formed in the inner part of the coupling bushing and can form part of the shaft/hub connection. The aperture is preferably designed in the form of a through-opening. According to this embodiment, the central aperture has an essentially star-shaped contour in cross section, this also making it possible to compensate for the manufacturing tolerances. The star-shaped inner aperture means that the inner part or the coupling bushing is slightly flexible and is thus capable of compensating for small manufacturing tolerances. A further advantage is that the star-shaped contour can also be used for the form-fitting transmission of torques from the output shaft of the drive to the coupling bushing.

In a preferred development, the protrusions are flattened concavely at the radially inner tips. This makes it possible to achieve abutment against essentially cylindrical portions of an output shaft of the drive.

The coupling bushing preferably has axial apertures in the region of the radial protrusions. The axial apertures extend to some extent in the axial direction through the coupling bushing, and preferably extend to the full extent through the coupling bushing. The apertures particularly preferably have an essentially trapezoidal shape in cross section. It is preferably the case that the cross section of the apertures corresponds to the cross section of the protrusions, and this, therefore, gives rise to an approximately uniform wall thickness between the aperture in the protrusion and the central aperture. Such apertures achieve reductions in weight and the amount of material used, and the protrusions are also formed in a flexible manner and are capable of absorbing jarring or other load peaks.

It is also preferred for the lateral flanks of the radial protrusions to be oriented essentially radially. This means that the flanks of the radial protrusions provide abutment surfaces for torque-transmitting purposes, and a force to which the coupling bushing is subjected by the output shaft of the drive acts perpendicularly on the flank of the protrusions when the drive drives the coupling bushing.

According to a further preferred embodiment, the coupling bushing has an axially extending collar, on which the output portion is formed. The axially extending collar extends preferably axially away from the inner part and is preferably formed on the outer part. The collar preferably has a diameter which is larger than the diameter of the axially adjacent portion of the coupling bushing. This also further compensates for manufacturing tolerances. This embodiment is preferred, particularly when the output portion is connected integrally to the roller body. In this case, the axially extending collar can be formed from a thin sheet-metal portion, which can be connected to the roller body straightforwardly by means of spot welding, in particular, by laser spot welding.

BRIEF DESCRIPTION OF THE DRAWINGS

The invention will be explained in more detail hereinbelow with reference to exemplary embodiments. In the figures.

DETAILED DESCRIPTION OF THE EMBODIMENTS

Figure 1:
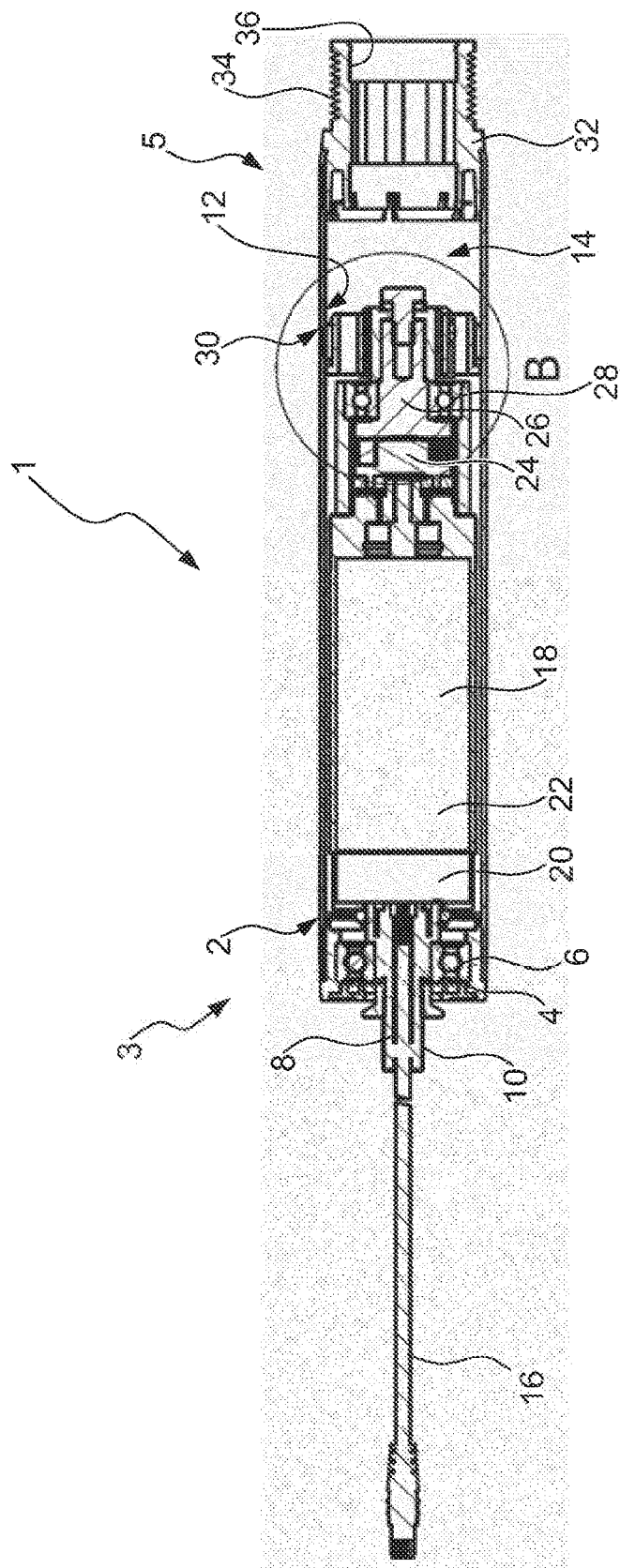
FIG. 1 is a cross section through a conveying roller.

FIG. 1 shows the basic construction of a motor-driven conveying roller 1 according to the invention. The roller body 2 has inserted in it, at a first end 3, an end cap 4, which is fixed to the roller body 2 and within which a rolling-contact bearing 6 is arranged. The rolling-contact bearing 6 serves to bear a bearing journal 8 in a rotatable manner. The bearing journal 8 is provided, at an outwardly oriented end, with an external thread, on which a nut 10 is screwed and with the aid of which the bearing journal 8 can be fastened in an opening of a framework in a torque-resistant manner. The framework here is clamped between the nut (not shown) and a sleeve, which is secured on the thread 10 in the inward direction in relation to the nut.

The roller body 2 has an inner circumferential surface 12, which delimits an interior 14 in the roller body 2 in the radially outward direction.

The bearing journal 8 is of hollow design, and supply and control lines 16 are guided through the inner bore of the bearing journal 8 to an internally arranged drive unit 18. The drive unit 18 is arranged within the roller body 2 and is connected to the bearing journal 8 in a torque-resistant manner. At its end, which is oriented toward the bearing journal 8, the drive unit 18 has control electronics 20 for activating an electric drive motor 22, which is preferably designed in the form of a brushless, three-phase DC motor with an internal rotor. The drive motor 22 is arranged in the drive unit 18 between the control electronics 20 and a planetary transmission 24, which is arranged at that end of the drive unit 18 which is oriented away from the bearing journal 8.

The planetary transmission 24 has an output shaft 26, which, in turn, is mounted in a roller bearing 28.

In order to transmit torques from the output shaft 26 to the roller body 2, the conveying roller 1 has a coupling unit 30, which will be explained in more detail hereinbelow. As a result of torques being transmitted from the output shaft 28 to the roller body 2 via the coupling unit 30, the roller body 2 consequently rotates, by way of the drive torque, relative to the bearing journal 8 and the drive unit 18.

At the end 5 of the roller body 2, said end 5 being located opposite the bearing journal 8, a headpiece 32 is inserted into the roller body 2 in a torque-resistant manner. This headpiece 32 bears a plurality of W-shaped circumferential grooves 34, by means of which the rotation and the torque of the conveying roller 1 can be transmitted to adjacent idler rollers. The headpiece 32 contains a holder 36 for a rolling-contact bearing arrangement for bearing the conveying roller 1 on an end-side bearing journal (not shown).

Figure 2:
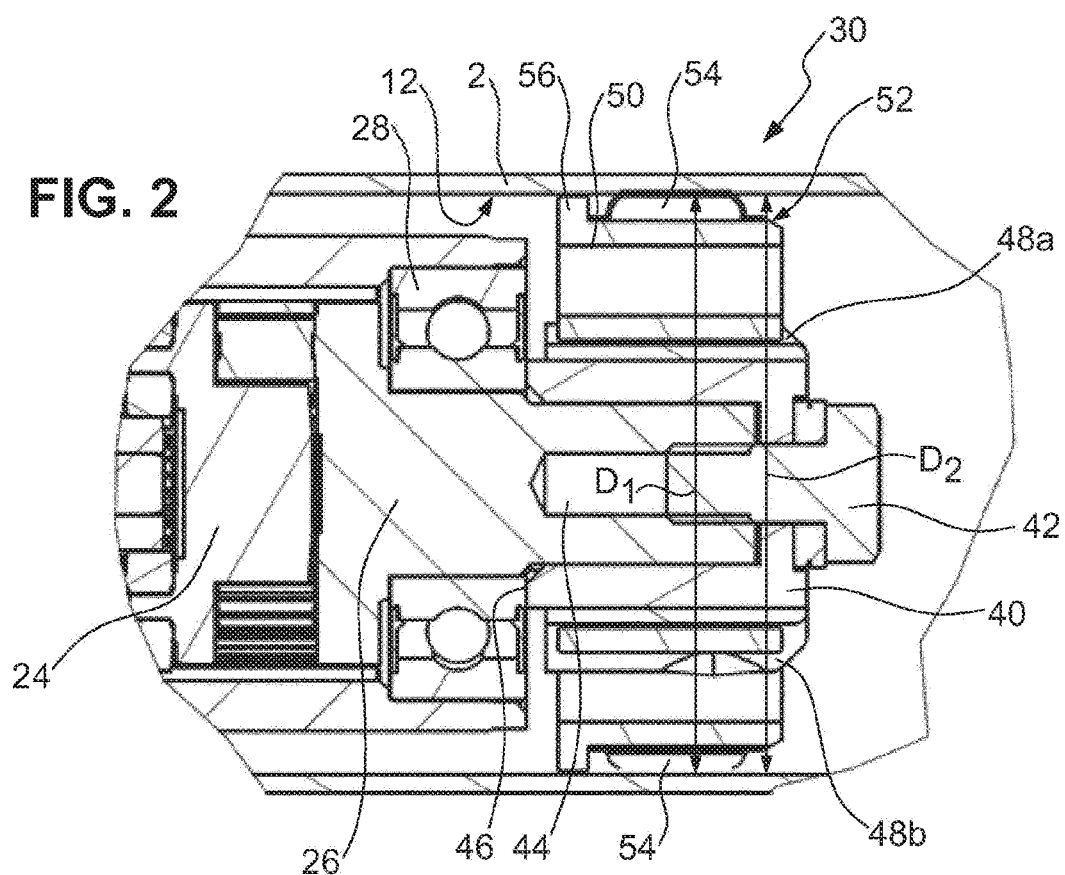
FIG. 2 is an enlarged cross section of the conveying roller from FIG. 1.

FIG. 2, then, shows an enlarged illustration of the detail B from FIG. 1. It is possible to see the coupling unit 30, which is installed on the output shaft 26. The coupling unit 30, first of all, has a hub 40, which is installed against the output shaft 26 by means of a screw 42. For this purpose, the output shaft 26 has a blind bore 44, which is provided with an internal thread. The hub 40 has an end 46 lying against the roller bearing 28 when, as in the embodiment illustrated, the said hub 40 is fixed axially on the output shaft 26 by way of the screw 42.

In the radially outward direction, the hub 40 has an essentially cylindrical basic shape, which is provided with radial protrusions 48a, 48b.

Figure 10:
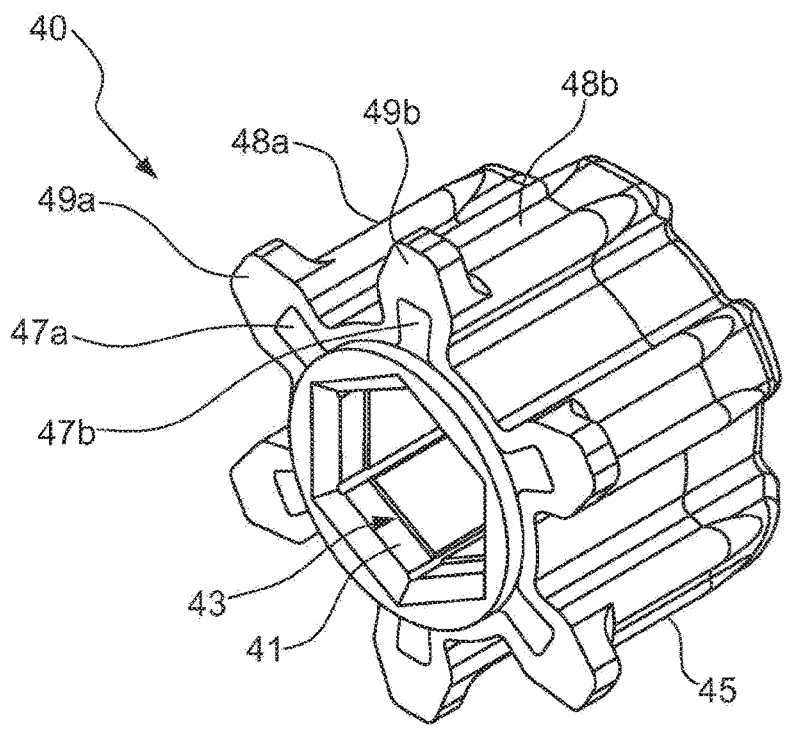
FIG. 10 is a perspective view of a hub for the coupling bushings according to FIGS. 2 and 4 to 9.
Figure 11:
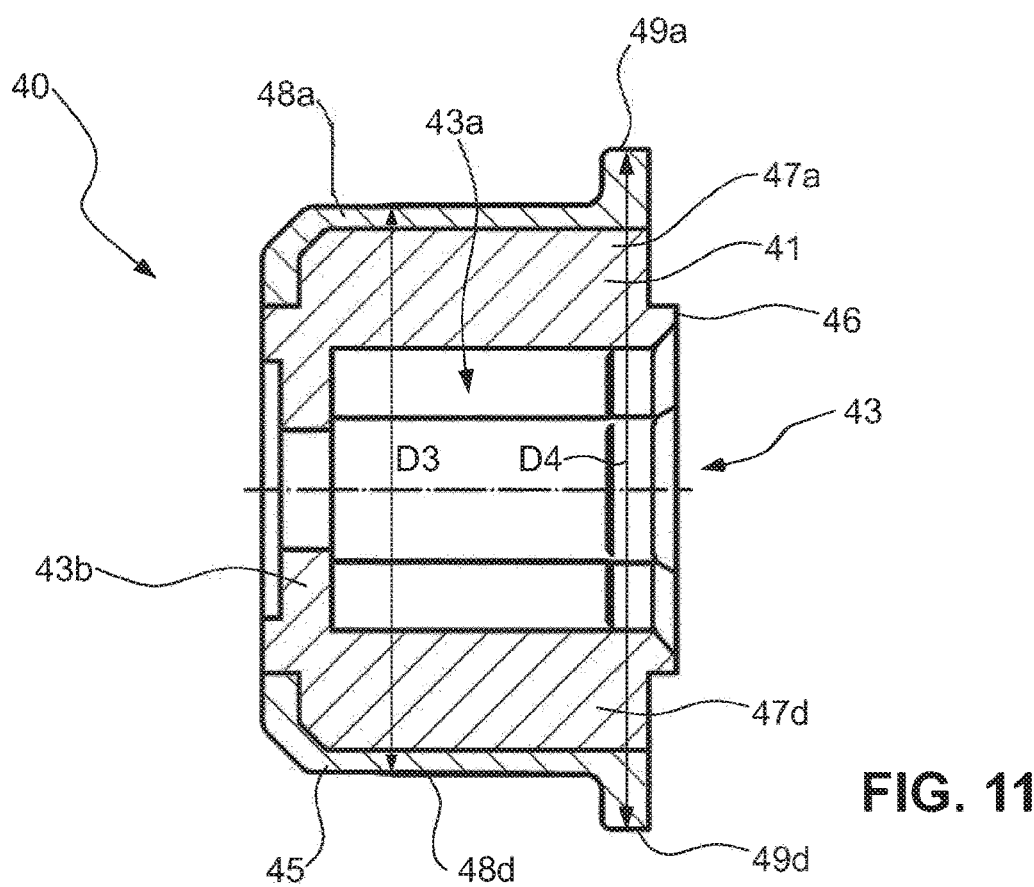
FIG. 11 is a section through the hub according to FIG. 10.

According to this first exemplary embodiment (FIG. 2), a single-part coupling bushing 50 is provided on the hub 40 (see also, FIGS. 10 and 11). The coupling bushing 50 has an output portion 52, which in this exemplary embodiment is connected to the inner circumferential surface 12 of the roller body 2 in a frictionally fitting manner, for torque-transmitting purposes, at certain points. For this purpose, the coupling bushing 50 has a plurality of radial noses 54, which are in contact with the inner circumferential surface 12.

In more specific terms, the noses 54 together define a diameter D1 which is somewhat larger than the diameter D2, which is the internal diameter of the roller body 2. The individual noses 54 are of slightly resilient design, and they can, therefore, deform elastically, in particular, such that the diameter D1 is reduced in size. This means that the coupling bushing 50 can be arranged axially in the interior 14 of the roller body 2, wherein the noses 54 subject the inner circumferential surface 12 elastically to a radial force, and this achieves a frictionally fitting connection between the coupling bushing 50 and roller body 2.

According to this exemplary embodiment, the coupling bushing 50 also has a crosspiece 56, which extends radially at an axial end of the output portion 52, but has a diameter which is smaller than the diameter D2. The crosspiece 56, rather than serving for torque-transmitting purposes, serves solely to position the coupling bushing 50.

Figure 3:
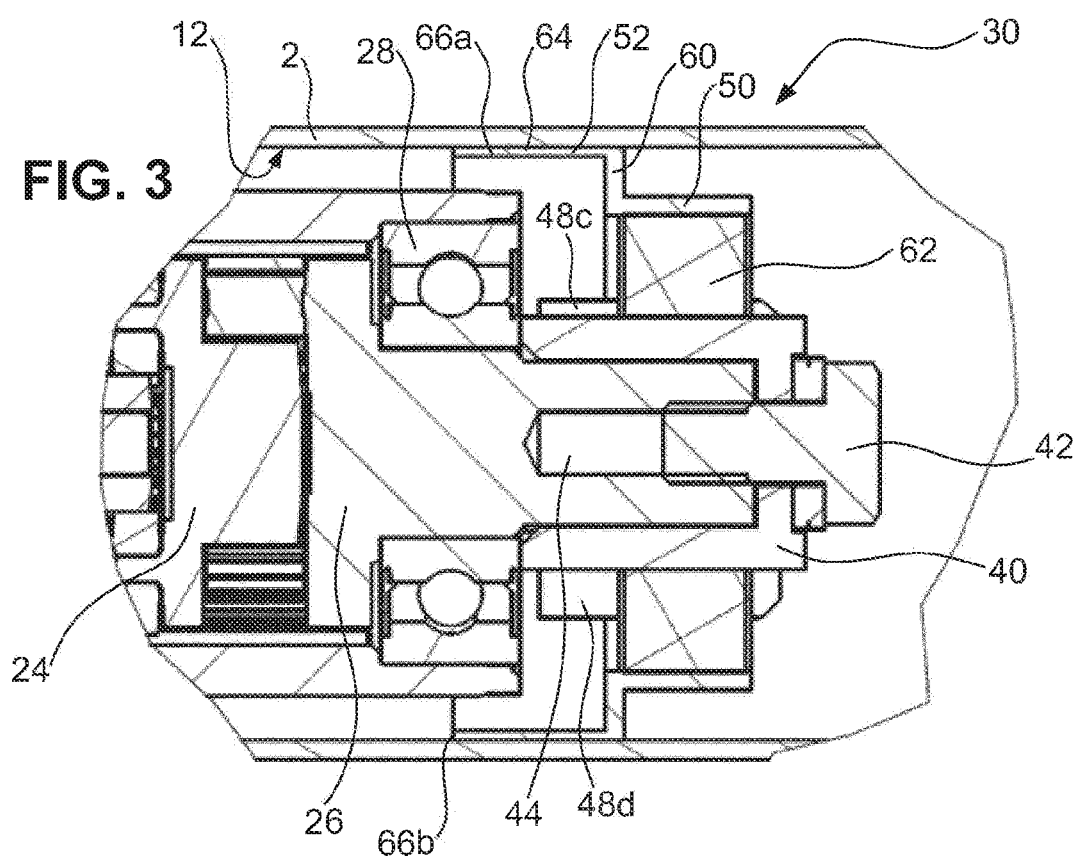
FIG. 3 is a second exemplary embodiment in a cross section according to FIG. 2.

FIG. 3 shows a further embodiment of the invention. Identical and similar elements are provided with identical reference signs and, to this extent, reference is made in full to the above description relating to FIGS. 2 and 1.

FIG. 3 likewise illustrates the detail B from FIG. 1, use being made in this case of a different coupling bushing 50.

The coupling bushing 50 is seated on the hub 40, which, in turn, like the hub 40 according to the first exemplary embodiment (FIG. 2), is provided with radial protrusions 48*c*, 48*d*. According to this exemplary embodiment (FIG. 3), the coupling bushing 50 is in two parts and will be explained in more detail with reference to FIGS. 10 and 11. In this exemplary embodiment, the coupling bushing 50 has a radially outer part 60 and a radially inner part 62, wherein the radially inner part 62 is formed from a compliant material, in particular, a plastic or elastomer. The outer part 60 has the output portion 52, which according to this exemplary embodiment, is designed in the form of an axially extending collar. The collar 64 of the output portion 52 is formed from a thin-walled sheet-metal material, which, in particular, has a smaller thickness than the roller body 2. According to this exemplary embodiment, the thickness of the collar 64 is approximately half of the thickness of the roller body 2, in particular 40%, 30%, or less, of said thickness.

In this exemplary embodiment, the coupling bushing 50 is connected to the roller body 2 via an integral connection. A plurality of weld spots 66*a*, 66*b* are provided for this purpose and connect the collar 64 to the inner circumferential surface 12 of the roller body 2. It is possible for the individual weld spots 66*a*, 66*b* to be offset slightly in the axial direction from an axial end of the collar 64, as is shown for the weld spot 66*a*, or to be formed directly at the axial end, as is shown for weld spot 66*b*. This makes it possible to compensate for manufacturing tolerances and manufacturing-related inaccuracies of the collar 64 and of the roller body 2. The collar 64 is formed from a comparatively thin sheet-metal material and can thus also be compressed to some extent in the radial direction. This allows the coupling bushing 50 to be inserted, even if the collar 64 is slightly oversized in relation to the diameter of the roller body 2. However, since the collar 64 is made of a relatively thin sheet-metal material, it is not capable of providing a sufficient force-fitting press-fit connection between the coupling bushing 50 and the roller body 2. For torque-transmitting purposes, the collar 64 is, therefore, connected to the roller body 2 integrally at a plurality of individual weld spots.

In order to create the weld spots, preferably a laser tool is positioned at the end of the tubular body from the outside and, for welding purposes, the laser beam is focused at the desired locations within the tubular body, in order for the components, which are to be connected, to be melted at certain points.

It should be understood that the exemplary embodiments of FIGS. 2 and 3 can also be combined, FIGS. 2 and 3 merely illustrating different alternatives of the structures of said embodiments in the first instance. It is likewise preferred for the individual noses 54 to be connected, in addition to the inner circumferential surface 12 of the roller body 2, via weld spots 66*a*, 66*b*, this achieving even more effective torque transmission.

FIGS. 4 to 13 illustrate separately, and provide for more detailed explanation, of the various exemplary embodiments of the coupling bushings 50.

Figure 4:
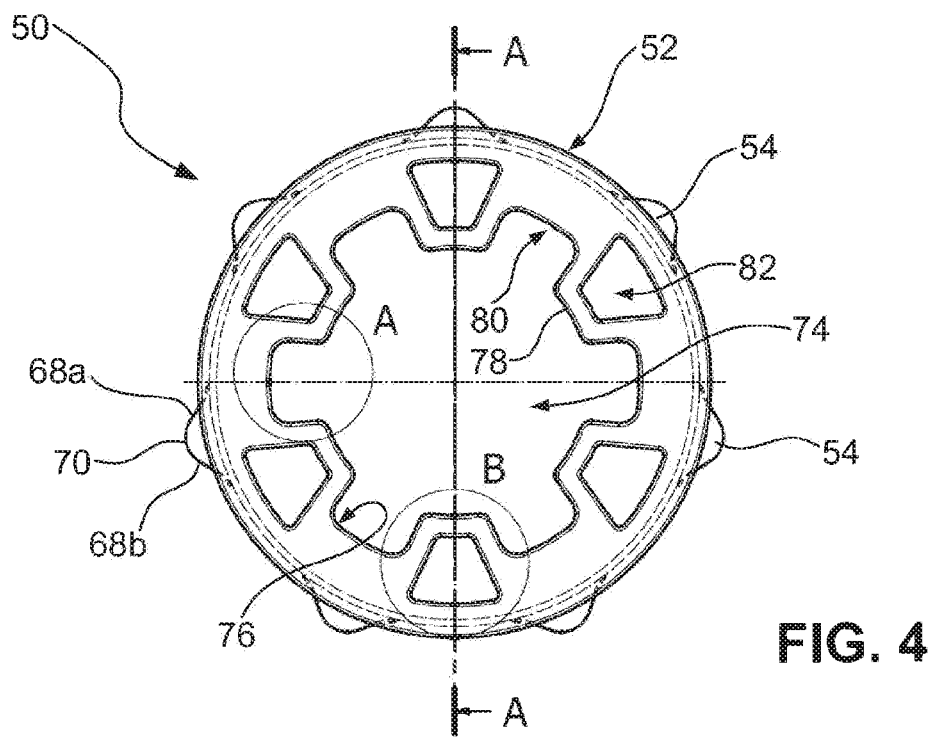
FIG. 4 is a side view of a coupling bushing according to the first exemplary embodiment.
Figure 5:
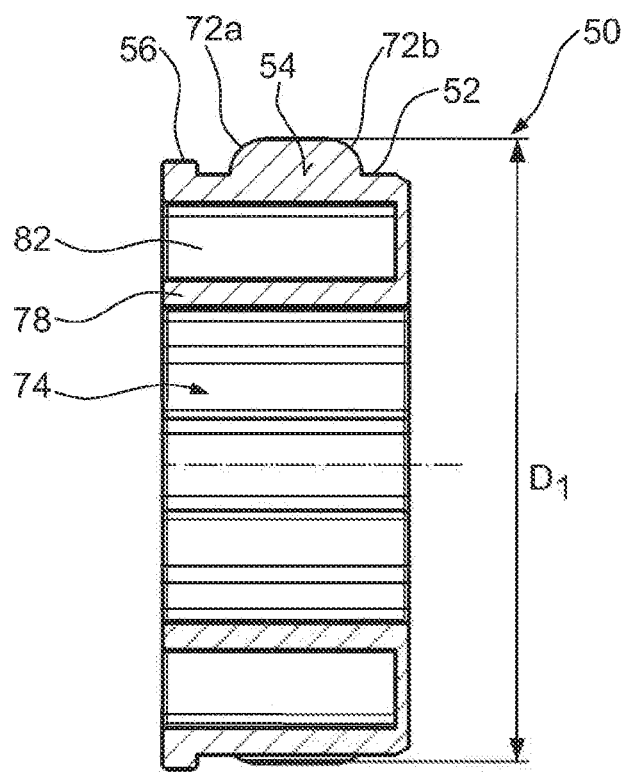
FIG. 5 is a cross section A-A according to FIG. 4.
Figure 6:
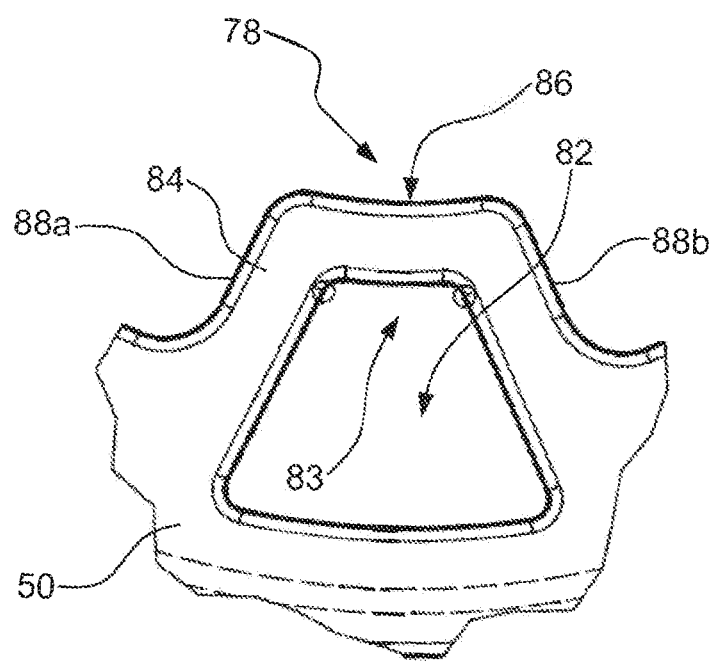
FIG. 6 provides the detail A from FIG. 4.
Figure 7:
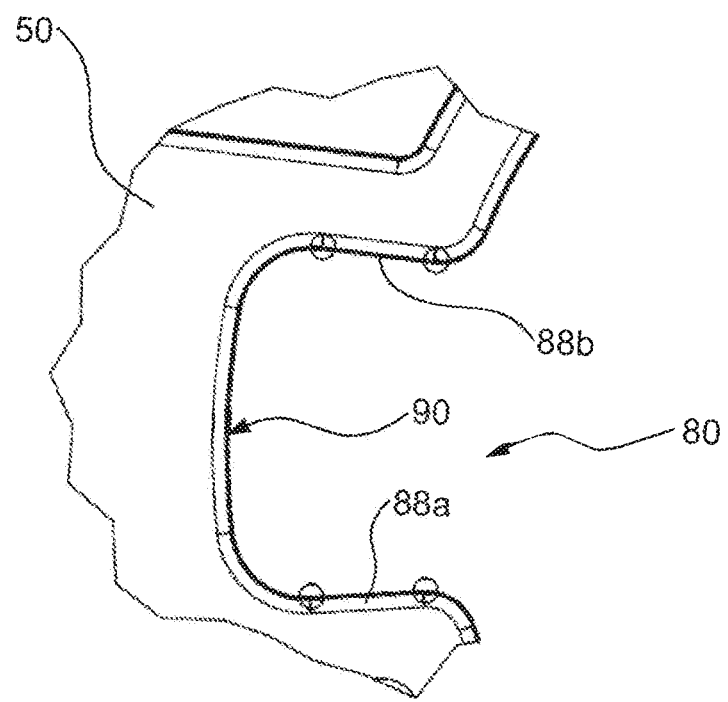
FIG. 7 provides the detail B from FIG. 4.

FIG. 4, in the first instance, shows a coupling bushing 50 as is basically also installed in the exemplary embodiment according to FIGS. 1 and 2. FIG. 5 shows the cross section A-A from FIG. 4, and both Figures will be discussed in equal measure hereinbelow.

As already described with reference to FIG. 2, the coupling bushing 50 has an output portion 52 and a plurality of radial noses 54 arranged thereon. According to this exemplary embodiment, a total of seven noses 54 (in FIG. 4, only two are provided with reference signs) are distributed uniformly around the circumference. The noses 54 together define a diameter D1 (see FIG. 5) which is slightly larger than the diameter D2 of the roller body 2. The noses 54 have a convex profile in cross section (see FIG. 4) and have two essentially flat flanks 68*a*, 68*b* and also a round tip 70. This configuration renders the noses 54 somewhat elastic overall, in that they can expand in the circumferential direction by radial compression. It is thus possible to compensate for tolerances and, nevertheless, to establish a good frictionally fitting connection between the coupling bushing 50 and the roller body 2.

The noses 54 likewise have convex introduction surfaces 72*a*, 72*b* in the axial direction, and it is, therefore, easily possible for the coupling bushing 50 to be inserted in the axial direction into the interior 14 of the roller body 2.

In the radially inward direction, the coupling bushing 50 has a central aperture 74, which is designed in the form of a through-aperture. This aperture 74 allows the coupling bushing 50 to be pushed in the axial direction onto the hub 40. The inner circumferential surface 76 of the central aperture 74 has a contour which allows a form-fitting connection in the direction of rotation between the hub 40 and the coupling bushing 50. For this purpose, a plurality of protrusions 78 and apertures 80 (in FIG. 4, only one of each is provided with reference signs) are provided on the central aperture 74, and are distributed uniformly in alternating fashion around the circumference of the central aperture 74.

According to this exemplary embodiment, axial apertures 82 (see FIG. 6) are provided in the region of the protrusions 78. These axial apertures 82 have an essentially trapezoidal shape in cross section perpendicular to the axis of rotation of the coupling bushing 50 (that is to say, in the plane of the drawing according to FIG. 6). The tip 83 of said trapezoidal shape essentially corresponds to the contour of the protrusion 78, and, therefore, a wall 84, which separates the axial aperture 82 from the central aperture 74 in the region of the protrusion 78, has an essentially constant wall thickness.

In the radially inward direction, the tips of the protrusions 78 have a concave contour 86. The lateral flanks 88*a*, 88*b* of the protrusions 78 are oriented essentially radially. As a result, the apertures 80 widen slightly in the radially outward direction and open out into a concave base 90. In particular, the radial orientation of the lateral flanks 88*a*, 88*b* results in the radial protrusions 48*a*, 48*b* on the hub 40 coming into planar contact with the flanks 88*a*, 88*b* and in the flanks 88*a*, 88*b* being subjected to a force essentially perpendicularly by the protrusions 48*a*, 48*b*.

The axial apertures 82, on the one hand, give rise to a reduction in weight and, on the other hand, explicitly provide for the slightly elastic design of the protrusions 78, serving to absorb jarring and other load peaks.

Figure 8:
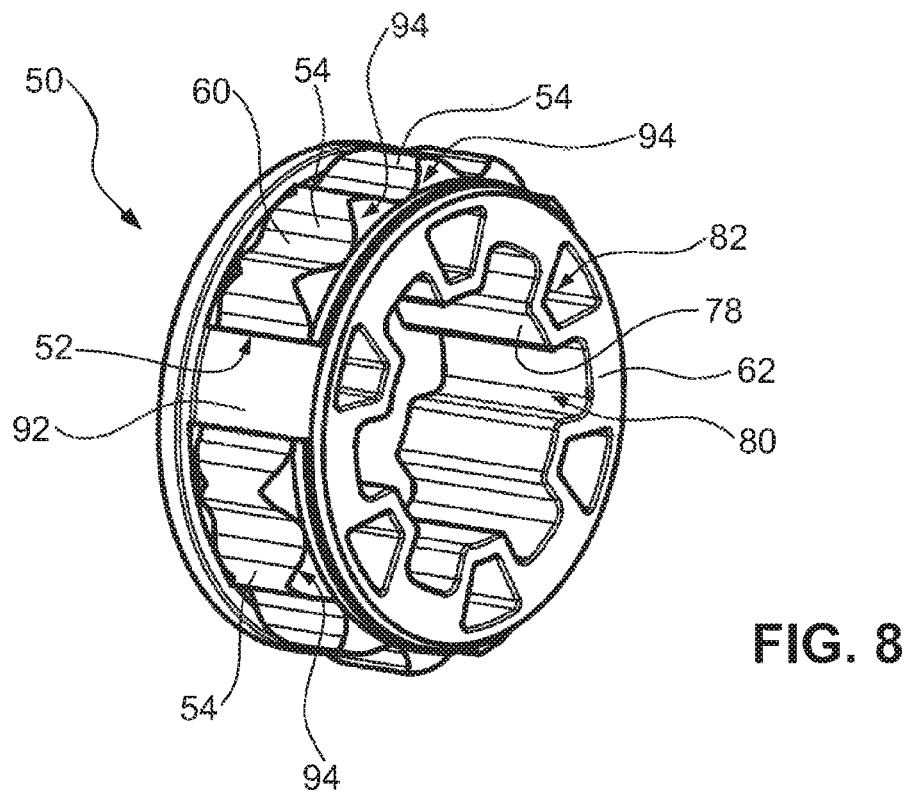
FIG. 8 is a perspective view of a coupling bushing according to a third exemplary embodiment.
Figure 9:
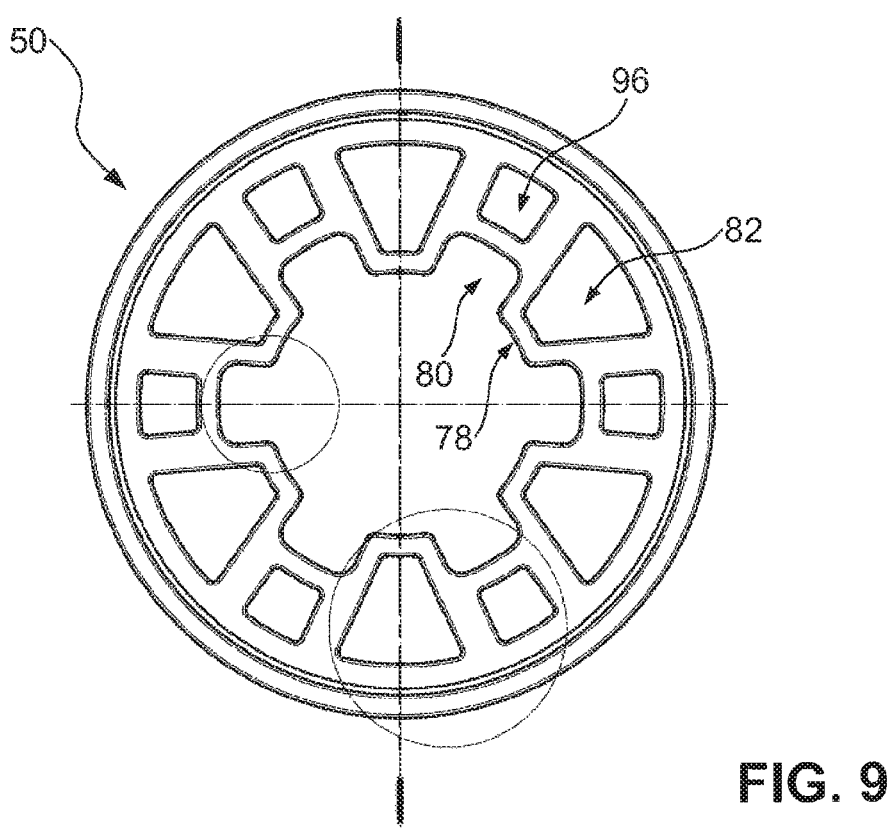
FIG. 9 is a side view of a coupling bushing according to a fourth exemplary embodiment.

FIGS. 8 and 9 illustrate a third exemplary embodiment, which is nevertheless similar to the first exemplary embodiment. According to the third exemplary embodiment (FIGS.

8 and 9), the coupling bushing 50 is formed in two parts. It has a radially inner part 62 and a radial outer part 60, which forms the output portion 52.

The inner part 62 has an essentially cylindrical circumferential surface 92, on which the outer part 60 in the form of a corrugated sheet-metal strip is fitted. The corrugated sheet-metal strip of the outer part 60 forms a plurality of noses 54, which in this embodiment are then hollow and define a cavity 94 in the interior. This develops the elasticity of the noses 54, and manufacturing tolerances can be compensated for even more effectively.

FIG. 9 shows a slightly modified exemplary embodiment, in the case of which not only trapezoidal apertures 82 are formed in the region of the protrusions 78, but, in addition, essentially rectangular axial apertures 96 are formed in the region of the apertures 80. This gives rise to a reduction in weight and also to a further elastic design of the coupling bushing 50.

A hub 40 as can be used with the coupling bushings 50 according to the above-described exemplary embodiments from FIGS. 2 and 4 to 9 will now be described in more precise terms with reference to FIGS. 10 and 11. The hub 40, according to FIGS. 10 and 11, has an inner hub part 41, which is preferably formed from an essentially rigid material, such as, in particular, wear-resistant plastic, e.g., polyamide. The inner hub part 41 has a central aperture 43, via which the hub 40 can be connected to the corresponding portion of the output shaft 26. The central aperture 43 has a first portion 43a, with a polygonal socket, and also has a stop ring 43b. The polygonal socket cooperates with the corresponding polygonal stub of the output shaft 26 for torque-transmitting purposes. The stop ring 43b serves for axial positioning purposes.

The hub 40 also has an outer part 45, which encloses the inner part 41 radially and circumferentially and is preferably formed from a compliant material, such as, in particular, an elastomer material. The outer part 41 defines the protrusions 48a, 48b, 48c, 48d (in FIGS. 10 and 11, not all the protrusions are provided with a reference sign). In the inward direction, the protrusions 48a, 48b, 48c, 48d are each supported by a crosspiece 47a, 47b, 47d, which is formed on the inner part 41 and extends radially therefrom. The crosspieces 47a, 47b, 47d provide reinforcement for the protrusions 48a, 48b, 48c, 48d.

At a first axial end, the protrusions 48a, 48b, 48c, 48d each have a radial tongue 49a, 49b, 49d, these tongues together defining a collar which has a diameter D4, which is larger than the diameter D3 of the protrusions 48a, 48b, 48c, 48d. The purpose of the tongues 49a, 49b, 49d is to prevent the hub 40 from "migrating" during operation when it is not secured by a screw 42. The hub 40 has the portion 43a arranged on the output shaft 26. The coupling bushing 50 is then pushed on and, thereafter, has its end side which is directed toward the drive butting against the tongues 49a, 49b, 49d. The drive and coupling bushing 50, for their part, are fixed axially; the drive being fixed via the end cap 4 and the coupling bushing 50 being fixed via its connection to the roller body 2. Therefore, the hub 40 is then also secured axially, and "migration" is prevented, even though it has a floating bearing arrangement and is not clamped by a screw 42.

Figure 12:
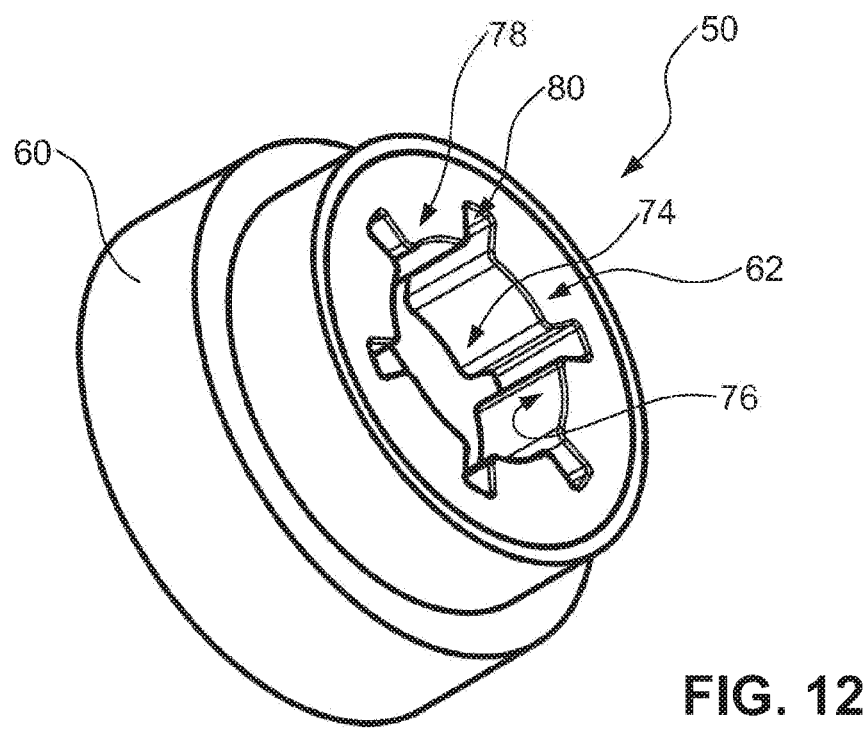
FIG. 12 is a perspective view of a coupling bushing according to the second exemplary embodiment.
Figure 13:
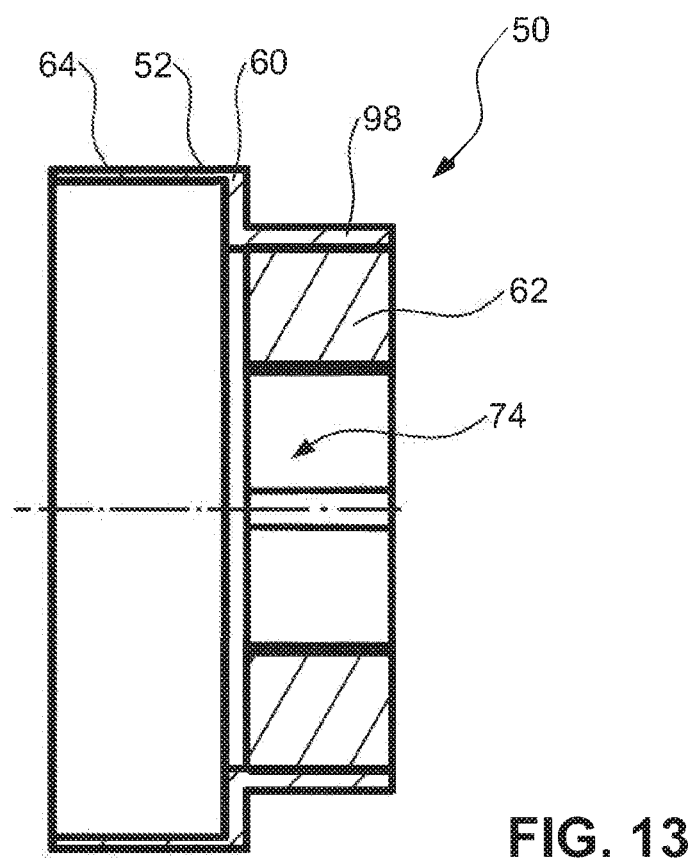
FIG. 13 is a section through the coupling bushing from FIG. 12.

FIGS. 12 and 13 illustrate a further embodiment of the coupling bushing, as is illustrated in FIG. 3. The coupling bushing according to FIGS. 12 and 13, once again, is in two parts and has an inner part 62 and an outer part 60. The inner part 62 is made of a plastic or elastomer material, in order to compensate for jarring or other load peaks. As has already been described with reference to FIG. 3, in this case the output portion 52 is designed in the form of a collar 64, which extends away from a portion 98 which encases the inner part 62. Whereas the portion 98 forms a radially outer sheath for the flexible inner part 62, the collar 64 is formed from a relatively thin sheet-metal material, which can be connected to the roller body 2 to good effect by means of spot welding. On the one hand, the axial extent of the collar 64 serves to keep the collar 64 flexible, so that the collar can both widen radially and decrease in size radially, in order to compensate for manufacturing tolerances. On the other hand, this formation also provides for a spatial distance between the weld spots and the inner part 62, in order to avoid heating of the flexible inner part 62. The use of laser spot welding increases this effect further.

In a manner corresponding to the first exemplary embodiments, the inner part 62 has a central aperture 74, which has an approximately star-shaped inner contour 76. It is also the case that this contour 76 has protrusions 78 and apertures 80, which are equally distributed around the circumference. The alternating apertures 80 and protrusions 78 serve to allow a form-fitting transmission of force and torque from the hub 40 to the coupling bushing 50.

Figure 14:
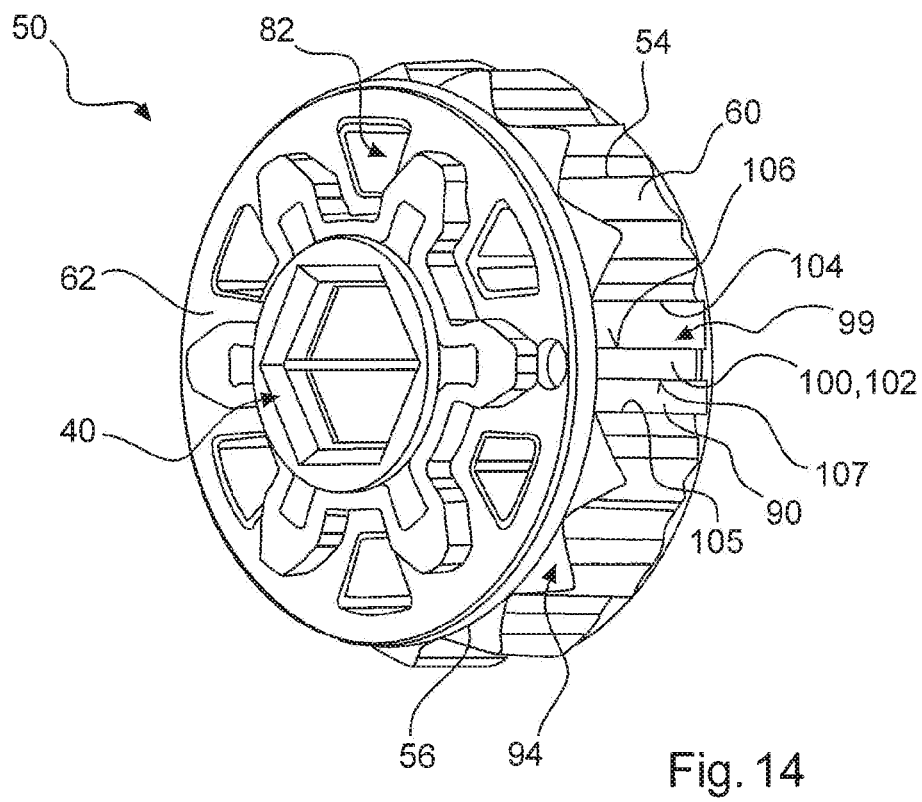
FIG. 14 is a perspective view of a coupling bushing according to a fifth exemplary embodiment, together with the hub according to FIG. 10.
Figure 15:
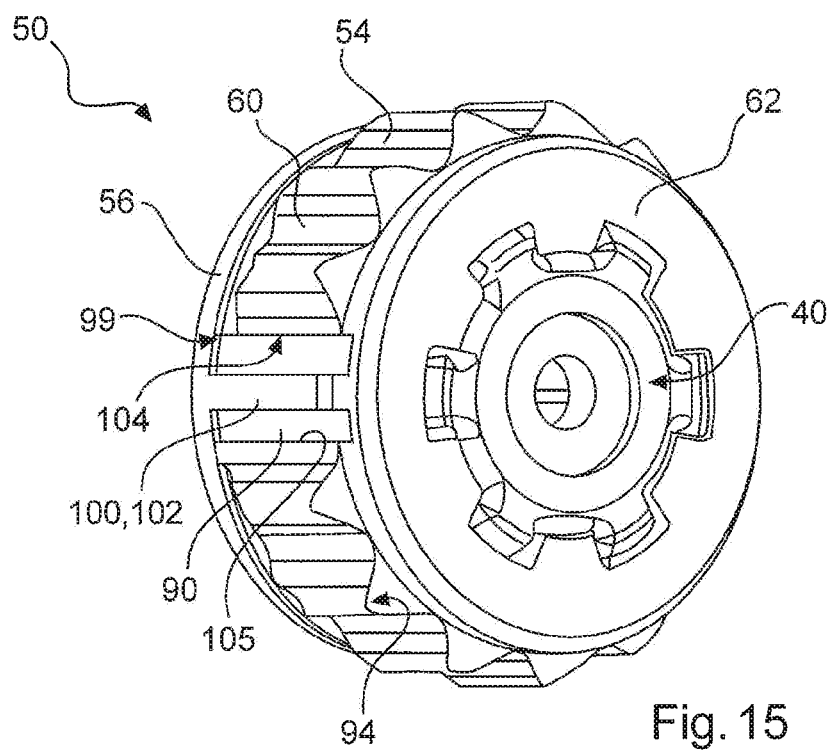
FIG. 15 is a further perspective view of the coupling bushing according to the fifth exemplary embodiment.

FIGS. 14 and 15 show a further exemplary embodiment of the coupling bushing 50. This exemplary embodiment is similar, in principle, to the third exemplary embodiment (FIG. 8) and the coupling bushing 50 is designed in two parts with a radially outer part 60, which defines the output portion 52, and a radially inner part 62. The radially outer part 60, once again, is designed in the form of a corrugated sheet-metal strip, which is seated on an essentially cylindrical circumferential surface 92 of the radially inner part 62.

The corrugated sheet-metal strip has a radial gap 99, which is delimited by a first end portion 104 and a second end portion 105. This gap 99 is also present in the sheet-metal strip of the third exemplary embodiment (FIG. 8). It serves to adapt the sheet-metal strip more easily to the diameter of the radially inner part 62.

As is already known from the first exemplary embodiment (FIG. 5), the radially inner part 62 has a crosspiece 56, which has a larger diameter than the circumferential surface 92 and thus serves to position the radial outer part 60 axially.

In order to prevent the radial outer part 60 from rotating in relation to the radially inner part 62, these exemplary embodiments (FIGS. 14 and 15) provide a rotation-prevention means 100. According to these exemplary embodiments, the rotation-prevention means 100 has a stop 102, against which one of the first and second end portions 104, 105 can strike. The stop 102 is seated within the gap 99, but has a circumferentially smaller extent, and, therefore, the radial outer part 60 can rotate to a certain extent until the first or second end portion 104, 105 comes into contact with the stop 102.

Circumferential end sides 106, 107 (see FIG. 14) of the stop 102 are oriented radially, and they, therefore, provide a planar abutment surface for the end portions 104, 105. This provides for reliable contact, which can prevent the radial outer part 60 from disengaging and moving axially away from the crosspiece 56. The diameter or the radial extent of the stop 102 is equal to, or smaller than, that of the crosspiece 56, and this provides for straightforward installation.

Instead of the stop 102, however, it is also conceivable to have a purely integral rotation-prevention means, for example, by one or more weld spots being provided in order to connect the sheet-metal strip to the circumferential surface 90.

For illustrative purposes here, the hub 40 of FIG. 10 has been inserted into the inner through-passage. In this exemplary embodiment (FIGS. 14 and 15), the apertures 82 are designed in the form of blind-hole-like depressions, and, therefore, the axial end side in FIG. 15 appears to be closed. This makes it possible, on the one hand, to reduce the amount of material used (mass inertia/costs) and, on the other hand, to achieve more or less constant wall thicknesses, which are advantageous for castings/injection moldings.

The invention claimed is:

1. A motor-driven conveying roller for conveying installations for conveying an article, the conveying roller comprising:
    a roller body having an outer circumferential surface constituting a bearing surface for the article;
    a drive unit disposed within an interior of the roller body; and
    a coupling unit adapted to transmit a torque from the drive unit to an inner circumferential surface of the interior of the roller body and comprising a coupling bushing having a drive portion connected to the drive unit and an outer peripheral output portion, wherein the coupling bushing is connected to the inner circumferential surface of the roller body by a friction fit connection only at certain points, without the use of mechanical fasteners.

2. The conveying roller as claimed in claim 1, wherein the torque-transmitting connection of the coupling bushing to the inner circumferential surface of the roller body comprises a circumferential frictionally fitting.

3. The conveying roller as claimed in claim 1, wherein the outer peripheral output portion of the coupling bushing comprises a plurality of radial noses in contact with the inner circumferential surface of the roller body when assembled.

4. The conveying roller as claimed in claim 3, wherein the inner circumferential surface of the roller body defines a first diameter and the plurality of radial noses together define a second diameter and wherein the second diameter of the plurality of radial noses together is larger than the first diameter of the inner circumferential surface.

5. The conveying roller as claimed in claim 3, wherein the plurality of radial noses are of compliant design.

6. The conveying roller as claimed in claim 3, wherein the plurality of noses are of internally hollow design.

7. The conveying roller as claimed in claim 1, wherein the outer peripheral output portion of the coupling bushing is welded to the inner circumferential surface of the roller body.

8. The conveying roller as claimed in claim 1, wherein between three and twenty separate connecting points are disposed around a circumference of the output portion of the coupling bushing, the coupling bushing being connected to the inner circumferential surface of the roller body at the connecting points.

9. The conveying roller as claimed in claim 8, wherein between five and fifteen separate connecting points are disposed around the circumference of the output portion of the coupling bushing.

10. The conveying roller as claimed in claim 9, wherein between seven and ten separate connecting points are disposed around the circumference of the output portion of the coupling bushing.

11. A motor-driven conveying roller for conveying installations for conveying an article, the conveying roller comprising:
    a roller body having an outer circumferential surface constituting a bearing surface for the article;
    a drive unit disposed within an interior of the roller body; and
    a coupling unit adapted to transmit a torque from the drive unit to an inner circumferential surface of the interior of the roller body and comprising a coupling bushing having a drive portion connected to the drive unit and an outer peripheral output portion;
    wherein the coupling bushing is connected to the inner circumferential surface of the roller body by a friction fit connection only at certain points without the use of mechanical fasteners, and wherein the coupling bushing comprises a radially outer part defining the outer peripheral output portion and a radially inner part, which forms part of a shaft/hub connection and is connected to an output shaft of the drive unit.

12. The conveying roller as claimed in claim 11, wherein the radially inner part is formed from a flexible material.

13. The conveying roller as claimed in claim 12, wherein the radially inner part is formed from an elastomer material.

14. The conveying roller as claimed in claim 11, wherein the radially outer part comprises a corrugated sheet-metal strip.

15. The conveying roller as claimed in claim 14, wherein the radially inner part has an essentially cylindrical circumferential surface on which the outer part is disposed.

16. The conveying roller as claimed in claim 11, wherein the radially outer part is in form-fitting relation relative the radially inner part to prevent relative rotation between the radially outer part and the radially inner part.

17. The conveying roller as claimed in claim 11, wherein the radially inner part further comprises a stop against which a circumferential end portion of the radially outer part strikes to secure against relative rotation between the radially outer part and the radially inner part.

18. The conveying roller as claimed in claim 1, wherein the coupling bushing is mounted in an axially displaceable manner in relation to the drive unit.

19. The conveying roller as claimed in claim 1, wherein the coupling bushing has a central aperture into which an output shaft of the drive unit is inserted, wherein the central aperture has protrusions and apertures extending radially in alternating fashion around an inner circumference of the central aperture.

20. The conveying roller as claimed in claim 19, wherein the protrusions are flattened concavely at a radially inner tip thereof.

21. The conveying roller as claimed in claim 19, wherein the coupling bushing has an axial aperture proximate one or more of the radial protrusions.

22. The conveying roller as claimed in claim 21, wherein the axial apertures are essentially trapezoidal in cross section.

23. The conveying roller as claimed in claim 19, wherein a lateral flank of one or more of the protrusions are oriented essentially radially.

24. A motor-driven conveying roller for conveying installations for conveying an article, the conveying roller comprising:
    a roller body having an outer circumferential surface constituting a bearing surface for the article;
    a drive unit disposed within an interior of the roller body; and
    a coupling unit adapted to transmit a torque from the drive unit to an inner circumferential surface of the interior of the roller body and comprising a coupling bushing having a drive portion connected to the drive unit and an outer peripheral output portion;

wherein the coupling bushing is connected to the inner circumferential surface of the roller body by an integral connection comprising spot welding only at certain points, and wherein the coupling bushing has an axially extending collar on which the outer peripheral output portion is formed, wherein a plurality of weld spots are provided for connecting the collar to the inner circumferential surface of the roller body.

25. The conveying roller as claimed in claim 24, wherein the axially extending collar extends axially away from a portion which encases an inner part and wherein the torque-transmitting connection of the coupling bushing to the inner circumferential surface of the roller body comprises an integral connection.

\* \* \* \* \*